United States Patent
Kasahara et al.

(10) Patent No.: US 10,374,219 B2
(45) Date of Patent: Aug. 6, 2019

(54) LITHIUM ION SECONDARY BATTERY

(75) Inventors: Ryuichi Kasahara, Tokyo (JP); Jiro Iriyama, Tokyo (JP); Shin Serizawa, Tokyo (JP); Hiroo Takahashi, Tokyo (JP); Tatsuji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 160 days.

(21) Appl. No.: 14/119,201

(22) PCT Filed: Apr. 13, 2012

(86) PCT No.: PCT/JP2012/060126
§ 371 (c)(1),
(2), (4) Date: Nov. 21, 2013

(87) PCT Pub. No.: WO2012/169282
PCT Pub. Date: Dec. 13, 2012

(65) Prior Publication Data
US 2014/0127557 A1    May 8, 2014

(30) Foreign Application Priority Data
Jun. 10, 2011    (JP) .................................. 2011-130373

(51) Int. Cl.
*H01M 4/13* (2010.01)
*H01M 4/04* (2006.01)
(Continued)

(52) U.S. Cl.
CPC ........... *H01M 4/13* (2013.01); *H01M 4/0404* (2013.01); *H01M 4/134* (2013.01);
(Continued)

(58) Field of Classification Search
CPC ..... H01M 4/13; H01M 4/1395; H01M 4/0404
(Continued)

(56) References Cited

U.S. PATENT DOCUMENTS 6,664,005 B2 * 12/2003 Kezuka ............... H01M 2/0212
  29/2
7,235,330 B1 * 6/2007 Fujimoto ............. H01M 4/134
  429/218.1
(Continued)

FOREIGN PATENT DOCUMENTS

JP    2001-266894    9/2001
JP    2002-170561    6/2002
(Continued)

OTHER PUBLICATIONS

International Search Report dated Jun. 12, 2012.
(Continued)

*Primary Examiner* — Stewart A Fraser
*Assistant Examiner* — Rachel L Zhang
(74) *Attorney, Agent, or Firm* — Finnegan, Henderson, Farabow, Garrett & Dunner, L.L.P.

(57) ABSTRACT

The object of an exemplary embodiment of the invention is to provide a lithium ion secondary battery having an excellent charge and discharge cycle property. An exemplary embodiment of the invention is a lithium ion secondary battery, comprising a battery assembly in which a positive electrode and a negative electrode are stacked through a separator and a package in which the battery assembly and an electrolyte are placed; wherein the negative electrode comprises a negative electrode collector which is composed of a metal and a negative electrode active material layer which is formed on the negative electrode collector and which comprises a negative electrode active material and a binder; wherein the negative electrode collector and the negative electrode active material layer have a crack which is formed so as to be communicated with each of them; and wherein the crack reaches an outer peripheral edge from an inside of the negative electrode.

10 Claims, 2 Drawing Sheets

(51) Int. Cl.
*H01M 4/1395* (2010.01)
*H01M 4/134* (2010.01)
*H01M 4/62* (2006.01)
*H01M 10/0525* (2010.01)
*H01M 10/0568* (2010.01)
*H01M 10/0585* (2010.01)

(52) U.S. Cl.
CPC ......... *H01M 4/1395* (2013.01); *H01M 4/622* (2013.01); *H01M 10/0525* (2013.01); *H01M 10/0568* (2013.01); *H01M 10/0585* (2013.01); *Y02T 10/7011* (2013.01)

(58) Field of Classification Search
USPC ........................................................ 429/163
See application file for complete search history.

(56) References Cited

U.S. PATENT DOCUMENTS

| 8,389,156 | B2* | 3/2013 | Kashiwagi | ............... | H01M 4/13 |
| | | | | | 429/209 |
| 2008/0083626 | A1* | 4/2008 | Kubo | ................... | C07C 211/63 |
| | | | | | 205/688 |
| 2010/0151325 | A1* | 6/2010 | Kasamatsu | ......... | H01M 2/1653 |
| | | | | | 429/223 |
| 2011/0159368 | A1* | 6/2011 | Hirose | .................. | H01M 4/134 |
| | | | | | 429/219 |
| 2011/0287313 | A1* | 11/2011 | Fukuoka | ................ | H01G 11/04 |
| | | | | | 429/188 |

FOREIGN PATENT DOCUMENTS

| JP | 2004-179136 | 6/2004 |
| JP | 2006-092969 | 4/2006 |
| JP | 2007-157704 | 6/2007 |
| JP | 2007-280665 | 10/2007 |
| JP | 2010-257988 | 11/2010 |
| JP | 2011-096638 | 5/2011 |
| JP | 2013/251147 | 12/2013 |
| WO | WO 2012-169282 | 12/2012 |

OTHER PUBLICATIONS

Notification of Reasons for Refusal with English-language translation issued by Japanese Patent Office dated Jul. 26, 2017, in corresponding Japanese Application No. 2016-159635.

\* cited by examiner

LITHIUM ION SECONDARY BATTERY

CROSS-REFERENCE TO RELATED PATENT APPLICATIONS

This application is a National Stage Entry of International Application No. PCT/JP 2012/060126, filed Apr. 13, 2012, which claims priority from Japanese Patent Application No. 2011-130373, filed Jun. 10, 2011. The entire contents of the above-referenced applications are expressly incorporated herein by reference.

TECHNICAL FIELD

An exemplary embodiment of the invention relates to a lithium ion secondary battery.

BACKGROUND ART

By the spread of mobile devices such as mobile phones and laptop computers, the role of a secondary battery as a power source thereof is regarded as important. The requirement is that this secondary battery have a small size, a light weight, and a high capacity, and that the deterioration of the charge and discharge capacity be difficult to occur. As a secondary battery having such properties, a lithium ion secondary battery is now widely used.

In the negative electrode of the lithium ion secondary battery, carbon such as graphite or hard carbon is mainly used. By using the carbon, the charge and discharge cycle can be repeated well, but capacity near the theoretical capacity has already been realized. Therefore, the large capacity improvement cannot be expected in the future. On the other hand, since the demand for capacity improvement in lithium ion secondary batteries is strong, there are some researches regarding a negative electrode material which has a capacity higher than that of the carbon, in other words, which has high energy density.

As the negative electrode of the lithium ion secondary battery, there are also some studies regarding metal lithium from the standpoint of high energy density and light weight. However, if metal lithium is used for the negative electrode, a dendrite (dendritic crystal) is precipitated on the surface of the metal lithium during charge and the crystal penetrates through the separator which causes an internal short-circuit, and thereby the life time of the battery may be shorten.

There are some studies in which a Li absorbing substance represented by a composition formula of $Li_xA$ (A is an atom such as silicon or tin) that is alloyed with lithium is used as the negative electrode active material in order to raise the energy density. This Li absorbing substance can absorb and desorb a large amount of lithium ion with respect to the unit volume and has a high capacity.

As a method for improving the cycle property in addition to raising the battery energy density, Patent documents 1 and 2 disclose a method that uses a negative electrode active material which contains silicon and silicon oxide.

Also, in the silicon negative electrode, a method for providing a recessed portion on the coin-type molded negative electrode and for forming a crack which starts from the recessed portion along the thickness direction thereof is proposed in Patent document 3. According to the method disclosed in Patent document 3, by forming a crack in the molded negative electrode, an effect is produced in which the disconnection of the current collecting paths along the thickness direction of the negative electrode is alleviated.

CITATION LIST

Patent Document

Patent document 1: JP 2002-170561 A
Patent document 2: JP 2006-092969 A
Patent document 3: JP 2007-157704 A

SUMMARY OF THE INVENTION

Problem to be Solved by the Invention

The battery, in which a Li absorbing substance such as silicon that is alloyed with lithium is used as the negative electrode active material, has a large absorbing and desorbing amount of lithium ion with respect to the unit volume and thereby it has a high capacity. However, pulverization by the expansion and contraction of the electrode active material itself when lithium ion is absorbed and desorbed occurs and the irreversible capacity at the first charge and discharge becomes large, and the charge and discharge cycle life may also be shortened. Also, by the expansion and contraction of the electrode active material itself, warpage and a wrinkling of the electrode may come to frequently occur.

Also, in the secondary battery disclosed in Patent documents 1 and 2 in which a negative electrode active material containing silicon or silicon oxide is used, pulverization occurs relatively less frequently, but warpage and wrinkling of the electrode may frequently occur. Also, there is still room for improving the charge and discharge cycle property.

Also, in the coin-type secondary battery disclosed in Patent document 3, by forming a crack in the molded negative electrode, the division of the negative electrode molded body is positively induced and an effect is thereby produced in which the disconnection of the current collecting paths along the thickness direction is alleviated. However, the method for forming a crack disclosed in Patent document 3 can only apply to a coin-type battery but cannot apply to a flat laminate-type secondary battery. Also, the technology disclosed in Patent document 3 is thought to be effective only in the case where the negative electrode comes into direct contact with a metal terminal, as in the case of a coin-type secondary battery.

Thus, the object of an exemplary embodiment of the invention is to provide a lithium ion secondary battery in which the disconnection of the current collecting paths is more effectively reduced and which has an excellent charge and discharge cycle property.

Means of Solving the Problem

One of the exemplary embodiments of the inventions is:
a lithium ion secondary battery, comprising a battery assembly in which a positive electrode and a negative electrode are stacked through a separator and a package which accommodates the battery assembly and an electrolyte;
wherein the negative electrode comprises a negative electrode collector, which is composed of a metal, and a negative electrode active material layer which comprises a negative electrode active material and a binder and which is formed on the negative electrode collector and;
wherein the negative electrode collector and the negative electrode active material layer have a crack which reaches each of them; and wherein the crack reaches an outer peripheral edge from an inside of the negative electrode.

One of the exemplary embodiments of the inventions is:
a method for producing a negative electrode which is used for a lithium ion secondary battery, comprising:

forming a negative electrode active material layer which comprises a negative electrode active material comprising at least silicon and a binder, on a negative electrode collector that is composed of a metal; and doping lithium into the negative electrode active material layer to form a crack which reaches the negative electrode collector and the negative electrode active material layer, and which reaches an outer peripheral edge.

Effect of the Invention

According to the present invention, it is possible to provide a lithium ion secondary battery in which the decrease of the discharge capacity is small even when it is repeatedly used and which has an excellent charge and discharge cycle property.

MODE FOR CARRYING OUT THE INVENTION

An exemplary embodiment of the invention relates to a lithium ion secondary battery, which has a battery assembly in which a positive electrode and a negative electrode are stacked through a separator and a package which accommodates the battery assembly and an electrolyte.

The negative electrode has a negative electrode collector which is composed of a metal and a negative electrode active material layer which is formed on the negative electrode collector. The negative electrode active material layer contains a negative electrode active material and a binder. As well, the negative electrode collector and the negative electrode active material layer have a crack which reaches each of them. The crack reaches an outer peripheral edge from an inside of the negative electrode.

By the negative electrode having a crack which is communicated with the negative electrode collector and the negative electrode active material layer in a stacked-type secondary battery, the accompanying effect of the negative electrode is increased, and even if expansion and contraction of the negative electrode active material occur, detachment of the negative electrode active material layer from the negative electrode collector is reduced, and disconnection of the collecting path in the negative electrode active material layer is reduced. Thus, in a secondary battery of an exemplary embodiment of the invention, the decrease of the discharge capacity becomes small if it is repeatedly used, and the charge and discharge cycle property becomes excellent.

As follows, an exemplary embodiment of the invention is explained with reference to drawings.

(Embodiment 1)

Figure 1:
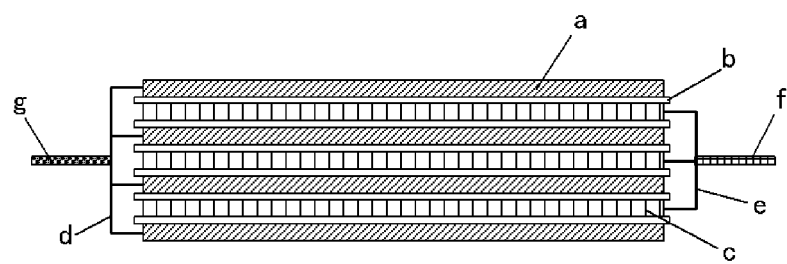
FIG. 1 is a schematic cross-sectional view showing one example of the structure of the battery assembly in an exemplary embodiment of the invention.

FIG. 1 is a schematic view showing a structure of an electrode assembly in an exemplary embodiment of the invention. The electrode assembly shown in FIG. 1 is flat laminate-type. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active material, and further positive electrode terminal f is welded to the welded part. Negative electrode collector d in each negative electrode a is electrically connected by being welded to one another at the end part thereof which is not covered with a negative electrode active material, and further negative electrode terminal g is welded to the welded part.

Figure 2:
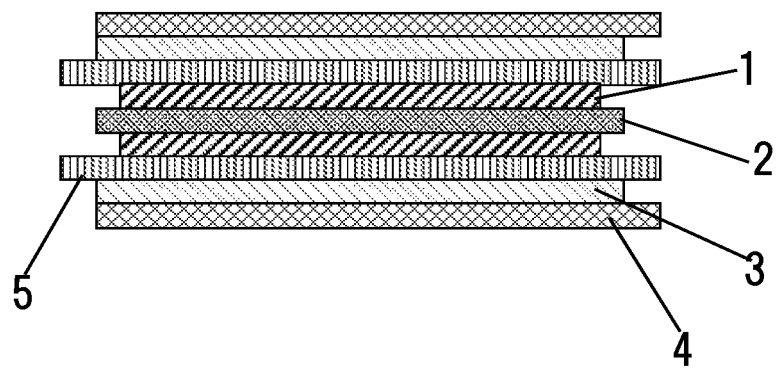
FIG. 2 is a schematic cross-sectional view showing one example of the structure of the battery assembly in an exemplary embodiment of the invention.

As shown in FIG. 2, a lithium ion secondary battery according to an exemplary embodiment of the invention has a negative electrode which is composed of negative electrode collector 2 such as a copper foil and negative electrode active material layer 1 formed on the surface thereof and a positive electrode which is composed of positive electrode collector 4 such as aluminum and positive electrode active material layer 3 formed on the surface thereof.

These negative electrode active material layer 1 and positive electrode active material layer 3 are oppositely placed through separator 5. The portion at separator 5 and the portion at which negative electrode active material layer 1 and positive electrode active material layer 3 are oppositely placed were impregnated with an electrolyte. The active material layer is formed on almost the entire area of the collector except for the connecting portion to a terminal and the like.

<Crack>

As mentioned above, the negative electrode has a crack which reaches the negative electrode collector and the negative electrode active material layer. As well, the crack reaches an outer peripheral edge from the inside of the negative electrode. In other words, the crack is formed so as to extend from the inside to reach an outer periphery in a plane direction of the negative electrode. By the crack, both of the negative electrode active material layer and the negative electrode collector are cut in the thickness direction. Since the negative electrode has such a crack, the accompanying effect of the negative electrode is increased, and even if expansion and contraction of the negative electrode active material occur, detachment of the negative electrode active material layer from the negative electrode collector is reduced, and disconnection of the collecting path in the negative electrode active material layer is reduced.

Figure 3:
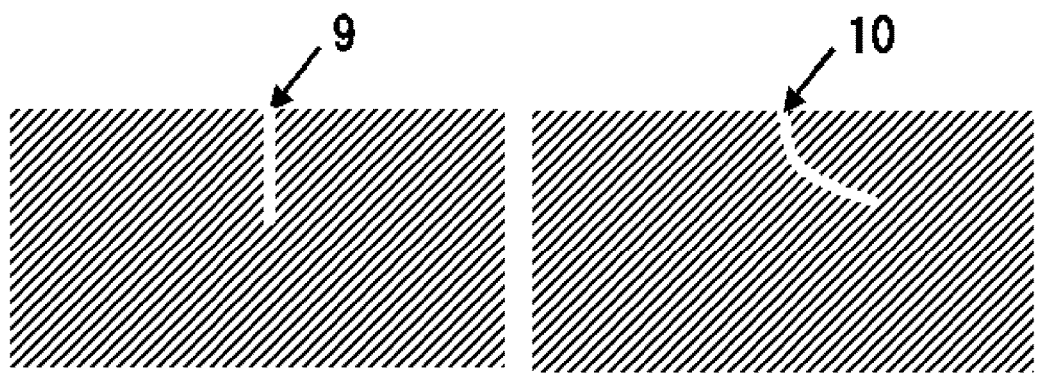
FIG. 3 is a schematic top view of the negative electrode showing an example of the structure of the crack in an exemplary embodiment of the invention.
Figure 3:
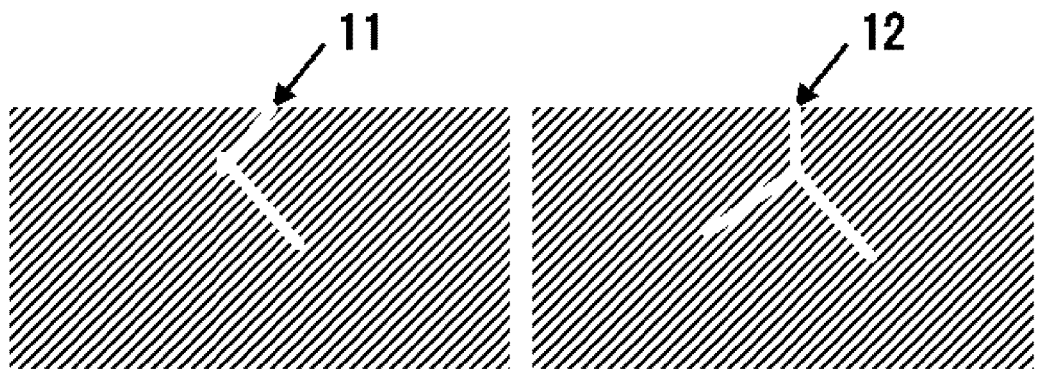

The shape of the crack is not particularly limited as long as it reaches the negative electrode collector and the negative electrode active material layer. Examples of the shape of the crack include, for example, linear-type 9, curve-type 10, polygonal-type 11, and branched-type 12, as shown in FIG. 3, or a type composed of a combination therewith.

Also, the crack reaches the outer peripheral edge. By another expression, the crack is extended from the outer peripheral edge into the inside of the negative electrode. Also, it is desirably that the crack does not divide the negative electrode collector into plural areas. In other words, it is desirable that one crack does not reach plural positions of the outer peripheral edge.

The length of the crack is preferably 0.5 cm or more and 3 cm or less from the outer peripheral edge from the standpoint of the accompanying effect to the expansion and contraction.

The method for forming the crack is not particularly limited. For example, the crack can be formed by making a slit using a cutting instrument. Also, in the case of containing silicon as a negative electrode active material, after a negative electrode active material layer is formed on a collector, lithium is doped into the negative electrode active material layer for the volume expansion of the negative electrode active material layer, which leads to the formation of the crack. In other words, by doping lithium into the negative electrode active material layer containing silicon, the volume expansion of the silicon contained in the negative electrode active material layer can occur, which leads to the formation of the crack from the outer peripheral edge of the electrode into the inside.

Silicon is a material having a large volume expansion due to lithium doping, and can be used as a preferred material from the standpoint of forming a crack. As mentioned above, the crack must reach not only the negative electrode active material layer but also the negative electrode collector. It is preferable to apply a material having a large volume expansion to the negative electrode active material in order to generate this crack in the negative electrode active material layer and the negative electrode collector. Thus, in the negative electrode active material layer having a negative electrode active material containing silicon, a crack can be easily formed by lithium doping.

As for the charge method in the case where the crack is formed by doping lithium, i.e. by the charge, it is preferable that the charge be carried out at a rated voltage, and it is more preferable that the voltage be raised to the rated voltage and thereafter be kept at a specified voltage for a certain period.

Also, the crack can be formed by a cutting instrument, but is preferably formed by the lithium doping. As for this reason, it is assumed that, when the crack is formed by lithium doping, the crack is formed at a position where local distortion in the negative electrode is large, which is thought to be result in some effect which is desired.

<Negative Electrode>

As mentioned above, the negative electrode has a negative electrode collector that is composed of a metal and a negative electrode active material layer formed on the negative electrode collector. The negative electrode active material layer contains a negative electrode active material and a binder.

The negative electrode active material is not particularly limited, but preferably contains silicon. Since the negative electrode active material containing silicon has a relatively large volume expansion due to the lithium doping, a crack is easily formed. Also, since the negative electrode active material containing silicon has a relatively large volume change at the time of the charge and discharge, the accompanying effect of the negative electrode caused by the crack is more pronounced.

Examples of the negative electrode active material containing silicon include, for example, simple substance silicon or silicon compounds. If the e negative electrode active material layer contains simple substance silicon, since volume expansion due to lithium doping is relatively large, the crack is easily formed. Also, since the negative electrode active material containing silicon has a relatively large volume change at the charge and discharge time, the accompanying effect of the negative electrode caused by the crack more effectively appears. Also, examples of the silicon compound include silicon oxide and transition metal-silicon compounds such as nickel silicide and cobalt silicide. The silicon compound has a role to relax the expansion and contraction due to the repeated charge and discharge of the negative electrode active material itself, and it is preferably used from the standpoint of the charge and discharge cycle property. Further, some kinds of the silicon compound has a function to maintain conduction between simple substance silicon particles. Thus, the negative electrode active material preferably contains simple substance silicon or both simple substance silicon and a silicon compound.

Here, the weight ratio of the simple substance silicon in the negative electrode active material layer is preferably 5% or more and less than 50%, and is more preferably 20% or more and less than 45%. When the weight ratio of the simple substance silicon is 5% or more, the battery capacity becomes large. Also, when the weight ratio of the simple substance silicon is less than 50%, the capacity decrease due to volume change due to the repeated charge and discharge tends to be reduced.

Also, the negative electrode active material preferably contains a carbon material in addition to simple substance silicon or a mixture of simple substance silicon and a silicon compound. The carbon material can be contained in a state of a complex with simple substance silicon or a silicon compound. Like a silicon compound, the carbon material has a role to relax the expansion and contraction due to repeated charge and discharge of the negative electrode active material itself and to ensure conduction between simple substance silicon which is a negative electrode active material. Thus, if both the carbon material and the silicon compound coexist, more excellent cycle property can be obtained.

Note that, the negative electrode active material used can be particulate. The negative electrode active material preferably contains a particle comprised of simple substance silicon, a particle comprised of a silicon compound, a particle comprised of a carbon material, or a particle comprised of a complex containing at least one of simple substance silicon, a silicon compound, and a carbon material. The average particle diameter $D_{50}$ of the particle contained in the negative electrode active material layer is 0.1 μm or more and 20 μm or less, and is more preferably 0.5 μm or more and 10 μm or less. When the average particle diameter of the particle contained in the negative electrode active material layer is in this range, the cycle property tends to be improved.

Examples of the method for producing a negative electrode active material containing simple substance silicon and a silicon compound include a method in which the simple substance silicon and the silicon oxide are mixed and are sintered under high temperature and reduced pressure if the silicon compound used is a silicon oxide. Also, if the silicon compound used is a transition metal-silicon compound, examples of the method include a method in which the simple substance silicon and the transition metal are mixed and melted, and a method in which the surface of the simple substance silicon is coated with a transition metal by evaporation or the like.

In addition to the above-mentioned production methods, a method of carbon complex to the surface of the negative electrode active material, which is generally performed until now, can also be applied. For example, by a method in which a mixed sintered body of simple substance silicon and a silicon compound is supplied into a gaseous atmosphere of an organic compound in a high temperature and non-oxygen atmosphere, or by a method in which a mixed sintered body of silicon and silicon oxide is mixed with a carbon precursor resin in high temperature and non-oxygen atmosphere, a coating layer of the carbon can be formed around a core of the silicon and the silicon oxide. By this, further improvement effects of reducing volume expansion due to charge and discharge and of the cycle property can be obtained.

For example, the negative electrode active material layer can be formed by dispersing and kneading a negative electrode active material formed by the above mentioned method and a negative electrode binder in a solvent, by applying the slurry obtained on a negative electrode collector, and by drying it in a high temperature atmosphere.

As a binder, a thermoset resin in which a dehydration condensation reaction by heating occurs, represented by a polyimide, a polyamide, a polyamide-imide, a polyacrylic acid-type resin, or a polymethacrylic acid-type resin, is preferably used. The thermoset resin has excellent adhesiveness of the negative electrode active material layer and the collector, and a transformation due to the expansion and distortion of the active material is easily generated. Therefore, it is because the accompanying effect that is one of the effects of an exemplary embodiment of the invention is increased. From such a standpoint, the binder is more preferably a polyimide, polyamide, or a polyamide-imide. These resins have a high tensile strength, a tensile elongation in a suitable range, and excellent accompanying effect.

The content of the binder is preferably 5 to 20 parts by mass with respect to 100 parts by mass of the negative electrode active material.

The solvent is not particularly limited, and examples thereof include, for example, N-methyl-2-pyrrolidone (NMP).

The negative electrode collector is composed of a metal, and examples of the metal include, for example copper, nickel, silver, or an alloying thereof from the standpoint of the electrochemical stability. Among these, copper or nickel is preferable.

Examples of the shape of the negative electrode include, for example, foil, flat plate, and mesh. Among these, from the standpoint that a crack is easily formed, it is preferably foil.

The thickness of the metal foil is, for example, 1 to 30 μm, is preferably 5 to 20 μm, and is more preferably 8 to 15 μm.

If desired, the negative electrode active material layer may contain an electroconductive agent such as carbon black or acetylene black in order to provide electroconductivity. The content of the electroconductive agent is preferably 0.1 to 5 parts by mass with respect to 100 parts by mass of the negative electrode active material.

The electrode density of the negative electrode produced is preferably in a range of 1.0 g/cm³ or more and 2.0 g/cm³ or less. If the electrode density is 1.0 g/cm³ or more, the charge and discharge capacity tends to become good. If the electrode density is 2.0 g/cm³ or less, impregnation with an electrolyte becomes easy and charge and discharge capacity tends to become good.

Further, if desired, the electrode density can be increased by a press processing of the negative electrode active material layer at normal temperature or a high temperature.

<Positive Electrode>

A positive electrode active material contained in a positive electrode active material layer is not particularly limited. As the positive electrode active material, for example, lithium manganate, lithium cobaltate, lithium nickelate, and a mixture thereof; a compound obtained by substituting all or a part of manganese, cobalt, or nickel of the above-mentioned compound by aluminum, magnesium, titanium, zinc, or the like; lithium iron phosphate; and the like can be used.

More specifically, examples of the positive electrode active material include lithium manganates having a lamellar structure or lithium manganates having a spinel structure such as $LiMnO_2$ and $Li_xMn_2O_4$ (0<x<2); $LiCoO_2$, $LiNiO_2$, or compounds in which a part of the transition metal thereof is substituted by another metal; lithium transition metal oxides such as $LiNi_{1/3}Co_{1/3}Mm_{1/3}O_2$ in which the molar ratio of a particular transition metal is not more than one half; and compounds which have Li at a larger amount than the stoichiometric amount in these lithium transition metal oxides. In particular, $Li_\alpha Ni_\beta Co_\gamma Al_\delta O_2$ (1≤α≤1.2, β+γ+δ=1, β≥0.7, and γ≤0.2) or $Li_\alpha Ni_\beta Co_\gamma Mn_\delta O_2$ (1≤α≤1.2, β+γ+δ=1, β≥0.6, and γ≤0.2) is preferable. The positive electrode active material can be used alone, or in combination with two or more kinds.

For the purpose of reducing impedance, an electroconductive auxiliary material may be added to a positive electrode active material layer containing a positive electrode active material. Examples of the electroconductive auxiliary material include carbonaceous fine particles such as graphite, carbon black, and acetylene black.

For example, the positive electrode active material layer can be formed by dispersing and kneading a positive electrode active material and a positive electrode binder in a solvent, by applying the slurry obtained on a positive electrode collector, and by drying it in a high temperature atmosphere.

A binder for the positive electrode is not particularly limited, but the same materials as a negative electrode binder can be used. Among these, from the standpoint of versatility and low cost, a polyvinylidene fluoride or a polytetrafluoroethylene is preferably used.

The solvent is preferably N-methyl-2-pyrrolidone (NMP), like the negative electrode.

As a positive electrode collector, the same materials for a negative electrode collector can be used. Also, as the positive electrode collector, aluminum is preferably used because high corrosion resistance in an organic electrolyte is demanded.

<Separator>

As separator 5, it is possible to use a porous film comprising a polyolefin such as polypropylene or a polyethylene, a fluorine resin, a polyimide, a polyamide-imide, or the like. Also, as the separator, a film obtained by laminating them can be used.

<Electrolyte>

The electrolyte may be a liquid electrolyte, or may be a polymer electrolyte in a gel or polymer state.

As the electrolyte, it is possible to use a non-aqueous electrolyte liquid in which a lithium salt is dissolved in a non-aqueous solvent.

The non-aqueous solvent is not particularly limited, but examples thereof include, for example, cyclic-type carbonates such as propylene carbonate (PC), ethylene carbonate (EC), butylene carbonate (BC), and vinylene carbonate (VC); chain-type carbonate such as dimethyl carbonate (DMC), diethyl carbonate (DEC), ethyl methyl carbonate (EMC), and dipropyl carbonate (DPC); aliphatic carboxylates such as methyl formate, methyl acetate, and ethyl propionate; γ-lactones such as γ-butyrolactone; chain-type ethers such as 1,2-ethoxyethane (DEE), and ethoxy methoxy ethane (EME); and cyclic-type ethers such as tetrahydrofuran and 2-methyl tetrahydrofuran.

Except for these, as the non-aqueous solvent, for example, aprotic organic solvents such as dimethylsulfoxide, 1,3-dioxolane, dioxolane derivatives, formamide, acetamide, dimethylformamide, acetonitrile, propionitrile, nitromethane, ethyl monoglyme, phosphoric acid triesters, trimethoxy methane, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone can be also used.

The lithium salt to be dissolved in the non-aqueous solvent is not particularly limited, but examples thereof include, for examples, $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lithium salts of lower aliphatic carboxylic acids, chloroborane lithium, lithium tetraphenylborate, LiBr, LiI, LiSCN, LiCl, and imide compounds.

Also, a polymer electrolyte may be used instead of an electrolyte liquid. Examples of the polymer electrolyte include, for example, well-known electrolytes.

<Package>

The shape of the package is not particularly limited, but can be a can or a film. If it is a can, for example, a stainless steel can is used as a case. If it is a film, a laminate film can be used.

The package is particularly limited, but is preferably a laminate film. The film package made of the laminate film can be, for example, two sheets of the laminate films by which the battery assembly is sandwiched and enclosed from both sides in the thickness direction of the battery assembly.

As the laminate film for the film package, a film which is generally used for this kind of the film package battery can be used as long as it has flexibility and the battery assembly can be sealed so that the electrolyte will not leak.

Examples of the typical layer configuration of the laminate film used for the film package include a configuration in which a metal thin film layer and a thermal fusion-bondable resin layer are stacked. Also, examples of the typical layer configuration of the laminate film other than the above include a configuration in which a protective layer composed of a film, which is made of a polyester such as a polyethylene terephthalate, a nylon, or the like, is a further stacked on the surface opposite to the thermal fusion-bondable resin layer of the metal thin film layer. If the battery assembly is sealed, the battery assembly is enclosed by thermal fusion-bondable resin layers which are oppositely placed. As the metal thin layer, for example, a foil such as Al, Ti, Ti alloy, Fe, stainless steel, or Mg alloying which has a thickness of 10 to 100 µm is used.

The resin used for the thermal fusion-bondable resin layer is not particularly limited as long as it is a resin which can be thermally fusion-bonded. For example, polypropylenes, polyethylenes, acid-modified material of these, polyphenylene sulfides, polyesters such as polyethylene terephthalates, polyamides, ethylene-vinyl acetate copolymer, ionomer resins in which an ethylene-methacrylic acid copolymer or an ethylene-acrylic acid copolymer is intermolecularly linked by a metal ion, and the like can be used as the thermal fusion-bondable resin layer. The thickness of the thermal fusion-bondable resin layer is preferably 10 to 200 µm, and is more preferably 30 to 100 µm.

(Embodiment 2)

In an exemplary embodiment of the present invention, it is preferable that the area of the negative electrode is larger than the area of the positive electrode oppositely placed, that the positive electrode is placed inside the outer peripheral edge of the negative electrode, and that the crack reaches at least a portion which is oppositely placed inside an outer peripheral edge of the positive electrode from the outer peripheral edge of the negative electrode. The active material layer is formed on almost the entire area of the collector except for the connecting portion to a terminal and the like. Also, in an exemplary embodiment of the present invention, the positive electrode is oppositely placed to the negative electrode through the separator, and is placed inside the outer periphery of the negative electrode. If the area of the negative electrode is larger than the area of the positive electrode, there is a merit in which the risk of a short-circuit trouble due to lithium precipitation during discharge can be reduced. On the other hand, however, since the degree of volumetric change in a portion where the negative electrode is not oppositely placed to the positive electrode is largely different from that of a portion where the negative electrode is oppositely placed to the positive electrode at the charge time, falling off of the negative electrode active material layer easily occurs. Thus, even if the area of the negative electrode is large, the falling off of the negative electrode active material layer can be reduced by forming a crack according to an exemplary embodiment of the present invention.

(Embodiment 3)

An exemplary embodiment of the invention can be considered to be a method for forming a negative electrode used for a lithium ion secondary battery. That is to say, an exemplary embodiment of the invention is a method for forming negative electrode used for a lithium ion secondary battery, comprising: forming a negative electrode active material layer comprising a negative electrode active material and a binder on a negative electrode collector that is composed of a metal wherein the negative electrode active material comprises at least silicon, and forming a crack which reaches the negative electrode collector and the negative electrode active material layer and which reaches an outer peripheral edge by doping lithium into the negative electrode active material layer.

When a negative electrode active material containing silicon is used, the negative electrode active material layer expands due to the lithium doping. As a result of this volume expansion, a crack can be generated in the negative electrode. The crack can be formed in the negative electrode before assembled in the battery assembly.

Also, from the standpoint that a crack can be easily formed, the negative electrode collector is preferably consists of a metal foil, and further the thickness thereof is preferably 1 to 30 µm.

The lithium doping can be carried out by producing a cell in which a negative electrode containing silicon, a separator, and metal lithium are stacked in this order, and by setting the potential between the negative electrode and the metal lithium to be, for example, 0.02 to 0.2 V. Also, it is carried out at a current of 0.05 to 1 C rate, but it is preferably carried out at as high a current as possible from the standpoint of generating the crack.

The crack is preferably formed by repeating doping or dedoping of lithium into or from the negative electrode active material layer.

EXAMPLES

As follows, an exemplary embodiment of the invention is more concretely explained by the Examples.

Example 1

<Negative Electrode>

As a negative electrode active material, a silicon-containing particle (simple substance silicon/silicon dioxide=40/60 (mass ratio)) whose average particle diameter $D_{50}$ measured by laser diffraction-scattering method was adjusted to 5 μm was prepared. 50 parts by mass of a polyamic acid-NMP solution (equivalent to 10 parts by mass of a polyimide which is finally obtained) as a binder solution and 5 parts by mass of a natural graphite powder whose average particle diameter $D_{50}$ was adjusted to 5 μm were mixed with 85 parts by mass of the silicon-containing particle. Further, NMP as a solvent was added and mixed to prepare a negative electrode slurry. This negative electrode slurry was applied on both sides of a copper foil with a thickness of 10 μm in a quadrangular shape of 155×80 mm, and a drying process was carried out at 125° C. for 5 minutes in a drying furnace. After that, a compression molding was carried out with a roll press, and a drying process was again carried out at 300° C. for 10 minutes in a drying furnace to form negative electrode active material layers on both sides of the negative electrode collector. Note that, the weight of the negative electrode active material layer formed was set to be a weight which corresponds to 1.5 mAh of the active material capacity (the first charge capacity of the negative electrode when the potential with respect to metal lithium reached 0.02 V; the same shall apply hereinafter in the negative electrode.). In this way, one sheet in which the negative electrode active material layers were formed on both sides of the negative electrode collector was produced, and a piece in a quadrangular shape of 160×80 mm (the applying portion of the negative electrode active material layer was 150×80 mm.) was stamped out from it to become a negative electrode precursor.

In the negative electrode precursor obtained, a slit was made using a cutter to produce a negative electrode having a crack. The slit (crack) was formed so as to cut both the negative electrode collector and the negative electrode active material layer. The slits were formed starting from each midpoint of the long side and the short side in the negative electrode with 160×80 mm at straight line with a length of 1 cm in a vertical direction from the edge side.

<Positive Electrode>

On the other hand, 4 parts by mass of a polyvinylidene fluoride as a binder and 4 parts by mass of a carbon powder (amorphous carbon powder) as a electroconductive agent were mixed with 92 parts by mass of a positive electrode active material particle made of lithium cobaltate. Further, NMP as a solvent was further added and dispersed to prepare a positive electrode slurry. This positive electrode slurry was applied on one side of an aluminum foil with a thickness of 20 μm in a quadrangular shape of 150×80 mm, and a drying processing was carried out at 125° C. for 5 minutes in a drying furnace. After that, a compression molding was carried out with a roll press to form a positive electrode active material layer on one side of the positive electrode collector. Note that, the weight of the positive electrode active material layer formed was set to be a weight which corresponds to 1.0 mAh of the active material capacity (the first charge capacity of the positive electrode when the potential with respect to metal lithium reached 4.3 V; the same shall apply hereinafter in the positive electrode.). In this way, two sheets in which the positive electrode active material layer was formed on one side of the positive electrode collector were produced, and a piece in a quadrangular shape of 160×80 mm (the applying portion of the positive electrode active material layer was 150×80 mm.) was stamped out from it to become a positive electrode.

<Separator>

A separator of a quadrangular shape with 170×100 mm made of a polypropylene porous film was prepared.

<Secondary Battery>

Next, a positive electrode, a separator, a negative electrode, a separator, and a positive electrode were stacked in this order from the bottom to obtain a laminated body.

Then, a negative electrode terminal made of nickel for bringing out the electrode was fusion-bonded to the negative electrode collector by ultrasonic bonding. Also, two sheets of the positive electrode collector were each stacked on the opposite side of the negative electrode terminal, and a positive electrode terminal made of aluminum for bringing out the electrode was fusion-bonded thereto by ultrasonic bonding. In this way, the positive electrode terminal and the negative electrode terminal were respectively placed at the long side portions which were oppositely located.

Package films were stacked on both sides of the laminate body obtained so that the adhesive layer comes to be placed on the laminated cell side, three sides among four sides at which the outer periphery portion of the package film was overlapped were thermally fusion-bonded (sealed). After that, electrolyte liquid was supplied, and the last one side was thermally fusion-bonded under vacuum. Here, as the electrolyte liquid, a liquid obtained by dissolving $LiPF_6$ at a concentration of 1 mol/l in a mixed solvent of EC (ethylene carbonate), DEC (diethyl carbonate), and EMC (ethyl methyl carbonate) at a volume ratio of 3:5:2 was used.

In obtained laminate-type battery 1, the edges of the negative electrode terminal and the positive electrode terminal are escaped from the package film and are respectively placed in the opposite directions.

(Cycle Property)

First, obtained laminate-type battery 1 was fully charged to a rated voltage of 4.2 V at 0.1 C rate in an atmosphere of a constant temperature of 20° C. After that, the discharge capacity was measured when it was discharged to 2.7 V. This discharge capacity is the first discharge capacity, namely the charge and discharge capacity.

Then, in each laminate-type battery, charging to 4.2 V and discharging to 2.7 V were repeated 100 times at 1 C rate in an atmosphere of a constant temperature of 45° C., and the discharge capacity after 100 cycles was measured at 20° C. Note that, 1 C rate means a current value for charging and discharging to the nominal capacity (mAh) in 1 hour. As well, the ratio of the discharge capacity after 100 cycles with respect to the first discharge capacity was calculated to be a capacity retention ratio.

The result of the capacity retention ratio is shown in TABLE 1.

Example 2

A battery was produced in the same manner as in Example 1 except that the slits were formed starting from each position which divided the long side and the short side in the negative electrode with 160×80 mm into quarters at straight line with a length of 1 cm in a vertical direction from the edge side. The capacity retention ratio of obtained laminate-type battery 2 was evaluated in the same manner as in Example 1.

Example 3

A battery was produced in the same manner as in Example 1 except that the slit were formed starting from each position which divided the long side into quarters as well as from each midpoint of the short side in the negative electrode with 160×80 mm at straight line with a length of 1 cm in a vertical direction from the edge side. The capacity retention ratio of obtained laminate-type battery 3 was evaluated in the same manner as in Example 1.

Example 4

A negative electrode which has a crack reaching an outer peripheral edge was obtained by decreasing the potential between metal lithium to 0.05 V at a rate of 1 C in the negative electrode precursor obtained, and thereafter by keeping it at 0.05 V for 1 hour. Laminate-type battery 4 was produced and the capacity retention ratio thereof was evaluated in the same manner as in Example 1 except that this negative electrode was used.

Example 5

A negative electrode which has a crack reaching an outer peripheral edge was obtained by decreasing the potential between metal lithium to 0.02 V at a rate of 1 C in the negative electrode precursor obtained, and thereafter by keeping it at 0.02 V for 1 hour. Laminate-type battery 5 was produced and the capacity retention ratio thereof was evaluated in the same manner as in Example 1 except that this negative electrode was used.

Example 6

A negative electrode which has a crack reaching an outer peripheral edge was obtained by decreasing the potential between metal lithium to 0.2 V at a rate of 1 C in the negative electrode precursor obtained, and thereafter by keeping it at 0.2 V for 1 hour. Laminate-type battery 6 was produced and the capacity retention ratio thereof was evaluated in the same manner as in Example 1 except that this negative electrode was used.

Example 7

A negative electrode which has a crack reaching an outer peripheral edge was obtained by decreasing the potential between metal lithium to 0.05 V at a rate of 0.05 C in the negative electrode precursor obtained, and thereafter by keeping it at 0.05 V for 5 hour. Laminate-type battery 7 was produced and the capacity retention ratio thereof was evaluated in the same manner as in Example 1 except that this negative electrode was used.

Example 8

A negative electrode which has a crack reaching an outer peripheral edge was obtained by decreasing the potential between metal lithium to 0.05 V at a rate of 0.2 C in the negative electrode precursor obtained, and thereafter by keeping it at 0.05 V for 1.25 hour. Laminate-type battery 8 was produced and the capacity retention ratio thereof was evaluated in the same manner as in Example 1 except that this negative electrode was used.

Example 9

As the negative electrode active material, a silicon-nickel mixture (simple substance silicon/nickel silicide=20/80 (mass ratio)), whose average particle diameter $D_{50}$ measured by laser diffraction-scattering method was adjusted to 5 μm, was prepared instead of the silicon-containing particle. 50 parts by mass of a polyamic acid-NMP solution (equivalent to 10 parts by mass of a polyimide which is finally obtained) as a binder solution and 5 parts by mass of a natural graphite powder whose average particle diameter $D_{50}$ was adjusted to 5 μm were mixed with 85 parts by mass of the silicon-nickel mixture,. Further, NMP as a solvent was added and they were dispersed to prepare a negative electrode slurry.

Laminate-type battery 9 was produced and the capacity retention ratio thereof was evaluated in the same manner as in Example 4 except that this negative electrode was produced using the negative electrode slurry.

Example 10

Laminate-type battery 10 was produced and the capacity retention ratio thereof was evaluated in the same manner as in Example 4 except that 67 parts by mass of a polyamide-imide
NMP solution (which is equivalent to 10 parts by mass of a finally obtained polyamide-imide) was used as the binder solution.

Example 11

Laminate-type battery 11 was produced and the capacity retention ratio thereof was evaluated in the same manner as in Example 4 except that 67 parts by mass of a polyamide NMP solution (which is equivalent to 10 parts by mass of a finally obtained polyamide) was used as the binder solution and that the temperature in the drying processing after the compression molding was set to be 250° C.

Example 12

Laminate-type battery 12 was produced and the capacity retention ratio thereof was evaluated in the same manner as in Example 4 except that nickel foil with a thickness of 10 μm was used as the negative electrode collector.

Comparative Example 1

Laminate-type battery 12 was produced and the capacity retention ratio thereof was evaluated in the same manner as in Example 1 except that a negative electrode precursor was used as the negative electrode, that is, except that a negative electrode which did not have a crack was used.

TABLE 1

| | evaluation result capacity retention ratio (%) |
|---|---|
| Ex. 1 | 80 |
| Ex. 2 | 84 |
| Ex. 3 | 81 |
| Ex. 4 | 90 |
| Ex. 5 | 91 |
| Ex. 6 | 87 |
| Ex. 7 | 92 |
| Ex. 8 | 88 |
| Ex. 9 | 85 |
| Ex. 10 | 90 |
| Ex. 11 | 94 |
| Ex. 12 | 85 |
| Comp. Ex. 1 | 71 |

The present application claims the priority based on Japanese Patent Application No. 2011-130373, filed on Jun. 10, 2011, the entire disclosure of which is incorporated herein by reference.

The present invention was explained with reference to embodiments and Examples, but the present invention is not limited to the above-mentioned embodiments and the Examples. In the constituents and the detail of the present invention, various changes which are understood by a person ordinarily skilled in the art can be made within the scope of the invention.

INDUSTRIAL APPLICABILITY

A lithium ion secondary battery according to an exemplary embodiment of the invention can be utilized for products to which a lithium ion secondary battery can be applied, for energy regeneration purposes of electrical vehicles, for power storage purposes by the combination of engine drive with solar cell, for emergency power sources of industrial instruments, for drives of consumer products, or the like.

REFERENCE SIGNS LIST a negative electrode
b separator
c positive electrode
d negative electrode collector
e positive electrode collector
f positive electrode terminal
g negative electrode terminal
1 negative electrode active material layer
2 negative electrode collector
3 positive electrode active material layer
4 positive electrode collector
5 separator
9 linear-type crack formed in negative electrode
10 curve-type crack formed in negative electrode
11 polygonal-type crack formed in negative electrode
12 branched-type crack formed in negative electrode What claimed is:

1. A lithium ion secondary battery, comprising a battery assembly in which a positive electrode and a negative electrode are placed oppositely through a separator and a package which accommodates the battery assembly and an electrolyte;
wherein the negative electrode comprises a negative electrode collector, which is composed of a metal, and a negative electrode active material layer which comprises a negative electrode active material and a binder and which is formed on the negative electrode collector;
wherein the negative electrode collector has a first crack and the negative electrode active material layer has a second crack, and the first and second cracks form a slit;
wherein the slit reaches an outer peripheral edge from an inside of the negative electrode; wherein the negative electrode active material comprises at least a particle comprising simple substance silicon, wherein the weight ratio of the simple substance silicon in the negative electrode active material layer is 5% or more and less than 50%; and
wherein the slit is formed by cutting both the negative electrode collector and the negative electrode active material layer.

2. The lithium ion secondary battery according to claim 1, wherein the negative electrode collector is composed of a metal foil.

3. The lithium ion secondary battery according to claim 1, wherein the binder comprises a thermoset resin.

4. The lithium ion secondary battery according to claim 3, wherein the binder comprises a polyamide, a polyimide, or a polyamide-imide.

5. The lithium ion secondary battery according to claim 1, wherein the electrolyte is a non-aqueous electrolyte liquid in which a lithium salt is dissolved in a non-aqueous solvent.

6. The lithium ion secondary battery according to claim 1, wherein the package is a laminate film.

7. The lithium ion secondary battery according to claim 1, wherein the positive electrode and the negative electrode have a flat shape.

8. The lithium ion secondary battery according to claim 7, wherein the area of the negative electrode is larger than the area of the positive electrode;
wherein the positive electrode is disposed in the inside of the outer peripheral edge of the negative electrode; and
wherein the slit reaches at least a portion which is opposite to the inside of the outer peripheral edge of the positive electrode from the outer peripheral edge of the negative electrode.

9. The lithium ion secondary battery according to claim 1, wherein the weight ratio of the simple substance silicon in the negative electrode active material layer is 20% or more and less than 45%.

10. The lithium ion secondary battery according to claim 1, wherein the first crack reaches the back surface opposite to that front surface of the negative electrode collector contacting with the negative electrode material layer.

* * * * *